US009680775B2

(12) United States Patent
Sirota et al.

(10) Patent No.: US 9,680,775 B2
(45) Date of Patent: *Jun. 13, 2017

(54) EVENT SCHEDULING

(71) Applicant: Intel Corporation, Santa Clara, CA (US)

(72) Inventors: Peter Sirota, Seattle, WA (US); Don Johnson, Seattle, WA (US); Sudheer Tumuluru, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/279,242

(22) Filed: May 15, 2014

(65) Prior Publication Data
US 2014/0249880 A1 Sep. 4, 2014

Related U.S. Application Data

(63) Continuation of application No. 13/962,462, filed on Aug. 8, 2013, now Pat. No. 8,775,949, which is a continuation of application No. 10/762,218, filed on Jan. 21, 2004, now Pat. No. 8,533,609.

(51) Int. Cl.
G06F 3/0482 (2013.01)
H04L 12/58 (2006.01)
G06Q 10/10 (2012.01)
H04L 12/18 (2006.01)
H04L 29/08 (2006.01)

(52) U.S. Cl.
CPC ............ *H04L 51/00* (2013.01); *G06F 3/0482* (2013.01); *G06Q 10/109* (2013.01); *G06Q 10/1095* (2013.01); *H04L 67/325* (2013.01); *H04L 69/329* (2013.01); *H04L 12/18* (2013.01); *H04L 67/26* (2013.01); *H04L 67/34* (2013.01)

(58) Field of Classification Search
CPC ..................................................... G06F 3/0482
USPC ........................................................ 715/753
See application file for complete search history.

(56) References Cited

U.S. PATENT DOCUMENTS

| 5,764,901 | A | 6/1998 | Skarbo et al. |
| 6,363,352 | B1* | 3/2002 | Dailey ............... G06Q 10/1095 705/7.19 |
| 6,457,045 | B1* | 9/2002 | Hanson ................ G06Q 10/107 707/999.01 |
| 6,487,585 | B1 | 11/2002 | Yurkovic |
| 6,560,637 | B1 | 5/2003 | Dunlap et al. |
| 6,598,075 | B1 | 7/2003 | Ogdon et al. |

(Continued)

OTHER PUBLICATIONS

Office Action received for U.S. Appl. No. 10/762,218, mailed on Apr. 4, 2008, 18 pages.

(Continued)

*Primary Examiner* — Reza Nabi
*Assistant Examiner* — Daniel Rodriguez
(74) *Attorney, Agent, or Firm* — Stoel Rives LLP

(57) ABSTRACT

In one aspect, the invention is a computer program product residing on a computer readable medium having a plurality of instructions stored thereon. The instructions when executed by the processor, cause that processor to schedule a network-based media event; and to invite an attendee to attend the network-based media event. Other aspects of the invention includes a process and a method.

28 Claims, 6 Drawing Sheets

(56) References Cited

U.S. PATENT DOCUMENTS

| | | |
|---|---|---|
| 6,636,888 B1 | 10/2003 | Bookspan et al. |
| 6,728,753 B1 | 4/2004 | Parasnis et al. |
| 7,177,905 B1* | 2/2007 | Slutsman ............ H04L 12/1813 348/E7.083 |
| 7,353,251 B1* | 4/2008 | Balakrishnan ...... H04L 12/1818 709/204 |
| 7,373,590 B2 | 5/2008 | Woolf ................... G06F 17/242 715/230 |
| 7,421,469 B1* | 9/2008 | Liu ........................ G06Q 10/10 709/204 |
| 7,716,594 B2 | 5/2010 | Fujii et al. |
| 8,533,609 B2 | 9/2013 | Sirota et al. |
| 2001/0032115 A1* | 10/2001 | Goldstein .............. G06Q 30/02 705/7.32 |
| 2002/0059148 A1* | 5/2002 | Rosenhaft ............ G06Q 10/087 705/77 |
| 2002/0071540 A1 | 6/2002 | Dworkin |
| 2002/0085029 A1* | 7/2002 | Ghani ................... G06Q 10/10 715/751 |
| 2002/0085030 A1* | 7/2002 | Ghani ................... G06Q 10/10 715/751 |
| 2002/0087592 A1* | 7/2002 | Ghani ................... G06Q 10/10 715/239 |
| 2002/0156848 A1 | 10/2002 | Grouse |
| 2003/0097419 A1* | 5/2003 | Pradhan .............. G06F 17/3087 709/217 |
| 2003/0220973 A1* | 11/2003 | Zhu .................... H04L 12/1831 709/205 |
| 2003/0229673 A1* | 12/2003 | Malik .................... H04L 51/04 709/207 |
| 2004/0002049 A1* | 1/2004 | Beavers ................... G09B 5/00 434/350 |
| 2004/0047461 A1* | 3/2004 | Weisman .......... H04M 3/42008 379/202.01 |
| 2004/0199580 A1* | 10/2004 | Zhakov ............... H04L 12/1818 709/204 |
| 2004/0201610 A1 | 10/2004 | Rosen et al. |
| 2005/0144246 A1* | 6/2005 | Malik .................. G06Q 10/107 709/206 |
| 2014/0040392 A1 | 2/2014 | Sirota et al. |

OTHER PUBLICATIONS

Office Action received for U.S. Appl. No. 10/762,218, mailed on Aug. 20, 2012, 13 pages.
Office Action received for U.S. Appl. No. 10/762,218, mailed on Dec. 9, 2009, 20 pages.
Office Action received for U.S. Appl. No. 10/762,218, mailed on Feb. 28, 2007, 16 pages.
Office Action received for U.S. Appl. No. 10/762,218, mailed on Mar. 3, 2009, 19 pages.
Office Action received for U.S. Appl. No. 10/762,218, mailed on Mar. 26, 2012, 12 pages.
Office Action received for U.S. Appl. No. 10/762,218, mailed on Mar. 30, 2010, 18 pages.
Office Action received for U.S. Appl. No. 10/762,218, mailed on Oct. 16, 2008, 17 pages.
Office Action received for U.S. Appl. No. 10/762,218, mailed on Oct. 31, 2007, 18 pages.
Office Action received for U.S. Appl. No. 10/762,218, mailed on Sep. 14, 2010, 13 pages.
Notice of Allowance received for U.S. Appl. No. 13/962,462, mailed on Mar. 6, 2014, 11 pages.
Office Action received for U.S. Appl. No. 13/962,462, mailed on Dec. 5, 2013, 14 pages.

* cited by examiner

EVENT SCHEDULING

This application is a continuation of application Ser. No. 13/962,462, filed Aug. 8, 2013 and entitled "Event Scheduling," which is a continuation of application Ser. No. 10/762,218, filed Jan. 21, 2004 and entitled "Event Scheduling," now U.S. Pat. No. 8,533,609, which applications are all hereby fully incorporated herein by reference in their entirety.

BACKGROUND

The Internet allows for the exchange of data and ideas between people in different geographic locations. Further, the Internet is becoming a valuable business communication tool in that it allows people to communicate via online discussion groups and meetings.

It is often cumbersome to schedule and conduct an online meeting. For example, whenever an individual intends to hold an online meeting, the proposed attendees for the meeting must be manually notified. Additionally, once the meeting is initiated, the attendees must manually connect to and log into the proper meeting. This may result in, among other things, missed meetings and attendees who choose not to attend due to the hassles associated with accessing the online meting.

SUMMARY OF THE INVENTION

According to an aspect of the invention, a method includes scheduling a presenting network-based media event.

Implementations may include one or more of the following features. A broadcast time, a broadcast date, and a broadcast type may be defined for the media event. Further, one or more options may be defined for the media event, such as an interactive poll, and a slideshow presentation.

A slideshow presentation may be uploaded, and one or more slides of the slideshow presentation may be converted into a standard image file format, such as: a bitmap (BMP) format, a joint photographic experts group (JPEG) format, a graphic image format (GIF), a tagged image file format (TIFF), and an encapsulated postscript (EPS) format.

The interactive poll may be configured, and one or more attendees may be specified to participate in a poll for the network-based media event.

The method may include inviting an attendee to attend the network-based media event. Attendees may be invited by sending an email invitation to an attendee, or generating a pop-up invitation on an attendee computer.

The method may include registering an attendee for the network-based media event. Attendees may be registered by assigning a password to an attendee, collecting information from an attendee, and transferring an applet to an attendee computer. Alternatively, there may be an automatic attendee registration based on a centralized authorization system like LDAP, etc.

The method may include reminding an attendee to attend the network-based media event. The attendee may be reminded by sending an email reminder to the attendee or generating a pop-up reminder on an attendee computer.

The method may include executing the network-based media event. A browser may be launched on an attendee computer at a predefined time, and this browser may be launched by an applet resident on the attendee computer.

A connection may be established between an attendee computer and a remote server. A data stream broadcast by the remote server may be accessed by the attendee with the browser. This data stream may be an encoded data stream that needs to be decoded.

A connection may be established between a remote server and a host computer, a host telecommunication device, or a host videoconferencing device.

A data stream may be broadcast from a remote server to one or more attendee computers. A file representative of a slideshow slide or a poll question may be embedded into the data stream. For example, instructions to advance a slide on the presentation may be embedded inside the stream to ensure that slides are synchronized with audio and/or video.

Poll data representative of an attendee response to the poll question may be transmitted from an attendee computer to the remote server. The poll data may be stored on the remote server. The data stream may be an audio stream, a video stream, or an audio/video stream, which may be encoded prior to being broadcast.

The above-described processes may also be implemented as a sequence of instructions executed by a processor.

The invention can provide one or more of the following advantages. The network-based media event may be scheduled. By designating a list of attendees, automatic notification can occur. Further, initiation of the media event may be automated on both the host's computer and the attendee's computer. In addition, the invention provides the ability to view a presentation and to interact with the presenter in a a number of ways, for example, polls, question & answer (Q&A), and the like. Furthermore, the invention enables various methods of communication to be synchronized.

DETAILED DESCRIPTION

Figure 1:
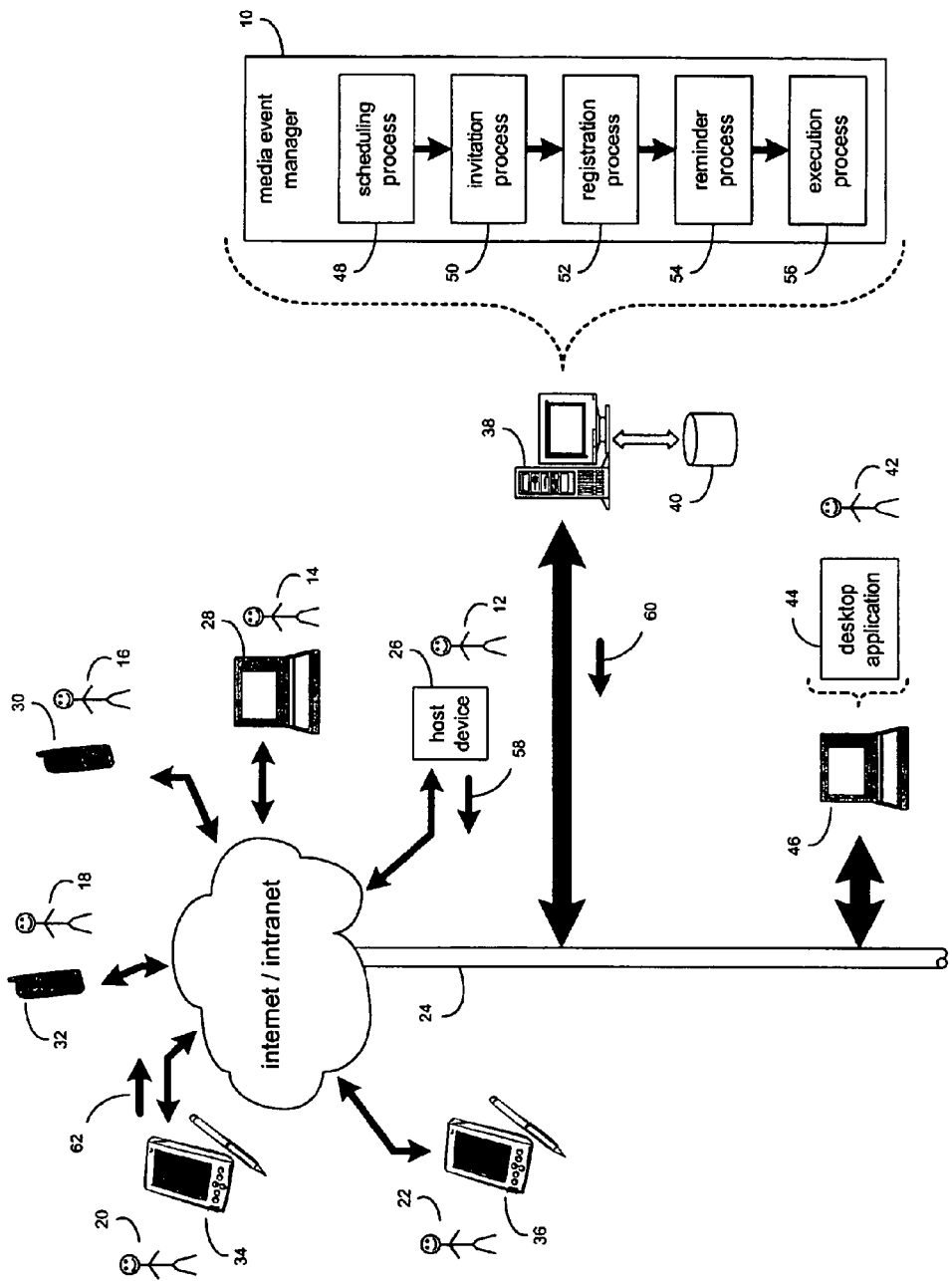
FIG. 1 is a block diagram of a system including a media event manager.

Referring to FIG. 1, a media event manager 10 that allows a host 12 to manage and orchestrate network-based media events, such as audio conferences, video conferences, and audio/video conferences is shown. These media events may be attended by various attendees 14, 16, 18, 20, and 22 using electronic devices that are coupled together via a distributed network 24 (e.g., the Internet, an intranet, a local area network, or some other form of network). Host 12 typically participates in the media event using a host device 26, such as a computer, a telecommunication device, or a video conferencing device, for example). Further, attendees 14, 16, 18, 20, and 22 typically participate in the media event via computers (e.g., computers 28), telecommunication devices (e.g., cell phones 30 and 32) or handheld personal digital devices (e.g., personal digital assistants 34 and 36).

Media event manager 10 typically resides on and is executed by a server 38 that is also connected to network 24. The instruction sets and subroutines of media event manager 10 are typically stored on a storage device 40 connected to server 38. Storage device 40 may be, for example, a hard disk drive, a tape drive, an optical drive, a RAID array, a random access memory (RAM), or a read-only memory (ROM).

An administrator 42 typically accesses and administers media event manager 10 through a desktop application 44 (e.g., Microsoft Internet Explorer™, Netscape Navigator™, or a specialized interface, not shown) running on a computer 46 that is also connected to the network 22.

Media event manager 10 includes five processes: a scheduling process 48, an invitation process 50, a registration process 52, a reminder process 54, and an execution process 56. Host 12 uses scheduling process 48 to schedule the media event, and invitation process 50 to invite the attendees designated by the host. Attendees register their intent to attend using registration process 52. Some time before the media event, a reminder process 54 sends out a reminder to the attendees and, around the time of the media event, the execution process 56 establishes the required connections and broadcasts the appropriate data streams. The operation of each of these processes 48, 50, 52, 54, and 56 is discussed below in greater detail.

Figure 2:
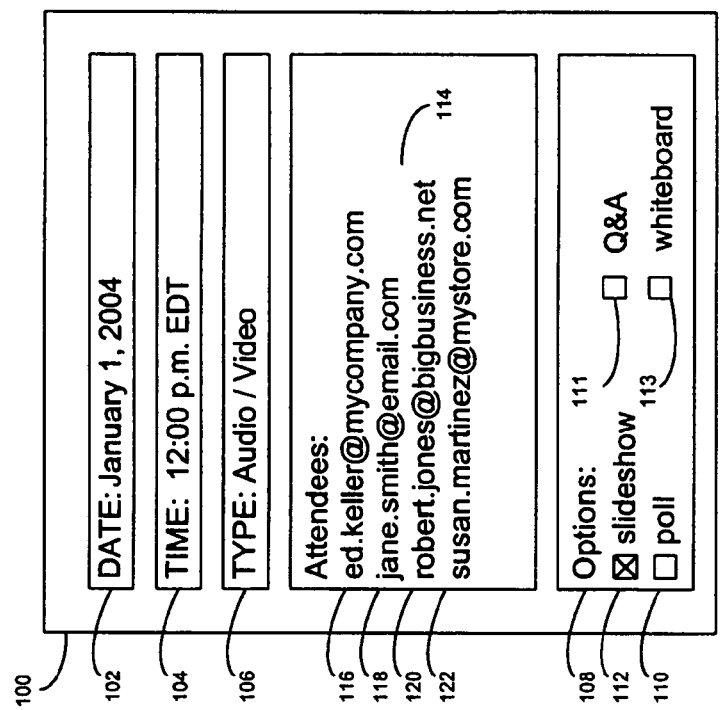
FIG. 2 is a block diagram of a scheduling configuration screen rendered by the media event manager of FIG. 1.
Figure 3:
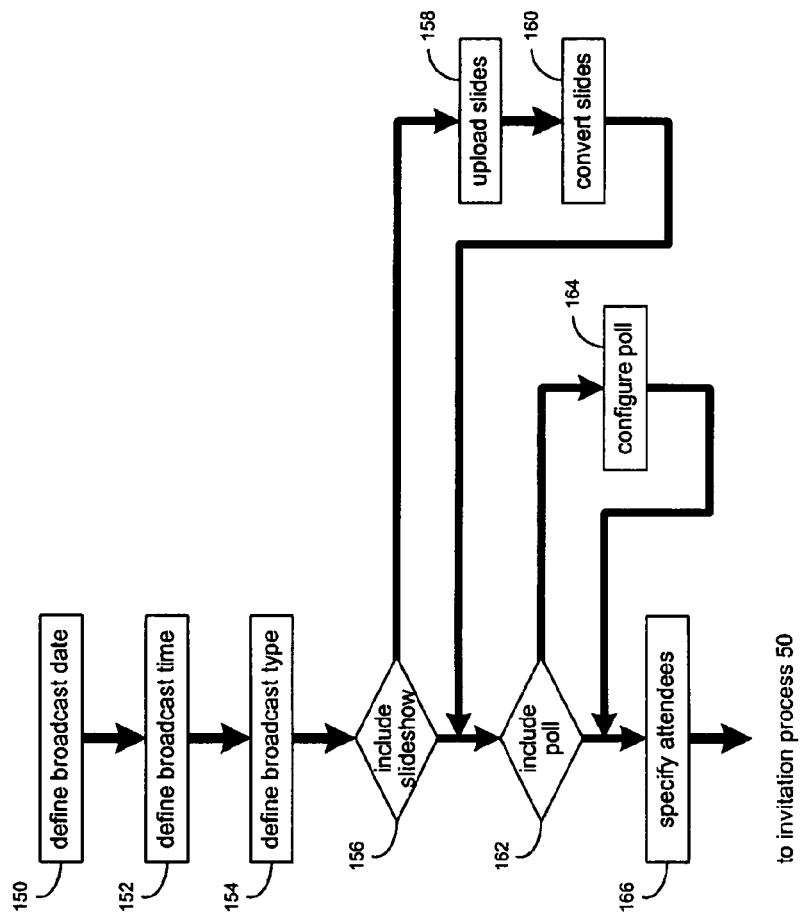
FIG. 3 is a block diagram of a scheduling process of the media event manager of FIG. 1.

Referring also to FIGS. 2 and 3, scheduling process 48 allows host 12 to schedule a media event. Typically, host 12 accesses scheduling process 48 through a desktop application (e.g., Microsoft Internet Explorer™, Netscape Navigator™, or a specialized interface, not shown) running on host device 26.

When scheduling a media event, host 12 configures the media event using a scheduling configuration screen 100 rendered by scheduling process 48. With scheduling configuration screen 100, host 12 can define 150 a broadcast date 102, and define 152 a broadcast time 104 for the media event. Host 12 can also define 154 a broadcast type 106 for the media event, such as whether the event is an audio-based event, a video-based event, or an audio/video-based event.

Additionally, host 12 may also select one of more options 108 to be included in the media event. Examples of these options include interactive polls 110, question and answer (Q&A) 111, slideshows 112 and whiteboard 113.

In the event that host 12 chooses 156 to include a slideshow in the media event they are hosting, scheduling process 48 uploads 158 the slideshow presentation to server 38 and converts 160 the slideshow presentation from a slideshow format (e.g., Microsoft PowerPoint™ format) to a standard image file format, such as: a bitmap (BMP) format, a joint photographic experts group (JPEG) format, a graphic image format (GIF), a tagged image file format (TIFF), and an encapsulated postscript (EPS) format. The power point presentation and converted pictures may be secured so that they are inaccessible to users until a presenter makes them accessible.

If host 12 chooses 162 to include an interactive poll in the media event, scheduling process 48 allows the user to configure 164 the interactive poll, which includes defining the questions to be asked, and defining the answer selections for each question.

Scheduling process 48 allows host 12 to specify 166 a list of attendees 114 to be invited to the media event. The list of attendees typically includes one or more email addresses 116, 118, 120, and 122, for example. Scheduling process 48 may also allow a presenter to select an open event which will be available to anyone that connects, for example, the event may be advertised on a website.

Figure 4:
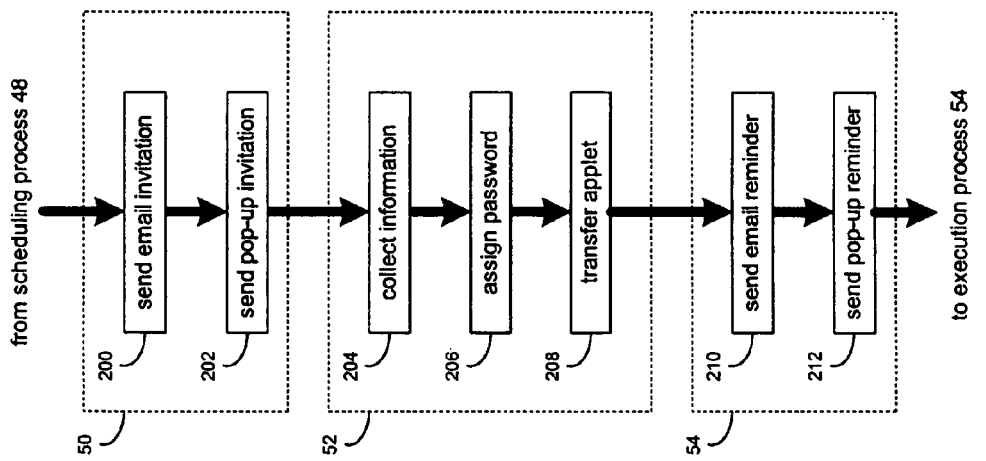
FIG. 4 is a block diagram of an invitation process, registration process, and reminder process of the media event manager of FIG. 1.

Referring to FIG. 4, invitation process 50 may invite the attendees (as designated by host 12) to attend the media event by sending 200 an email invitation (not shown) to the attendee. This email invitation may include a hyperlink that directs the attendee to a web site that allows the attendee to register for the media event. Alternatively, a pop-up window-based invitation (not shown) may be generated 202 on the attendee's computer (e.g., computer 28). This pop-up invitation may be generated through the use of an applet (e.g., a cookie) that is transferred to the attendee's computer.

When responding to an invitation, the attendee registers for the media event using a registration process 52. Registration process 52 typically collects 204, from the attendee, personal information (e.g., first name, last name, middle initial, employer, and telephone number, for example). Typically, the user identifier is the attendee's email address and the registration process will assign 206 the attendee a password. Alternatively, a password may be assigned prior to registration, when an invitation is sent. In addition, a global password may be assigned that is good for any user having access to it, for example, in group meetings.

An applet, such as a cookie, may be transferred 208 to the attendee's computer. This applet typically includes information concerning the media event (e.g., date, time, and type), and information about the attendee, including their user identifier and their password, thus allowing for an automated login to the media event.

Typically, at a predefined amount of time prior to the start time of the media event, a reminder process 54 will send reminders to the attendees designated by the host 12. These reminders may remind registered attendees to attend the media event, or remind unregistered attendees to register for the media event. The timing and frequency of the reminder(s) may be fixed by the administrator 42 or may be adjustable by the host 12. In a fashion similar to inviting attendees, when reminder process 54 reminds attendees, an email reminder (not shown) may be sent 210 to the attendees or a pop-up reminder (not shown) may be generated 212 on the attendee's computer.

Figure 5:
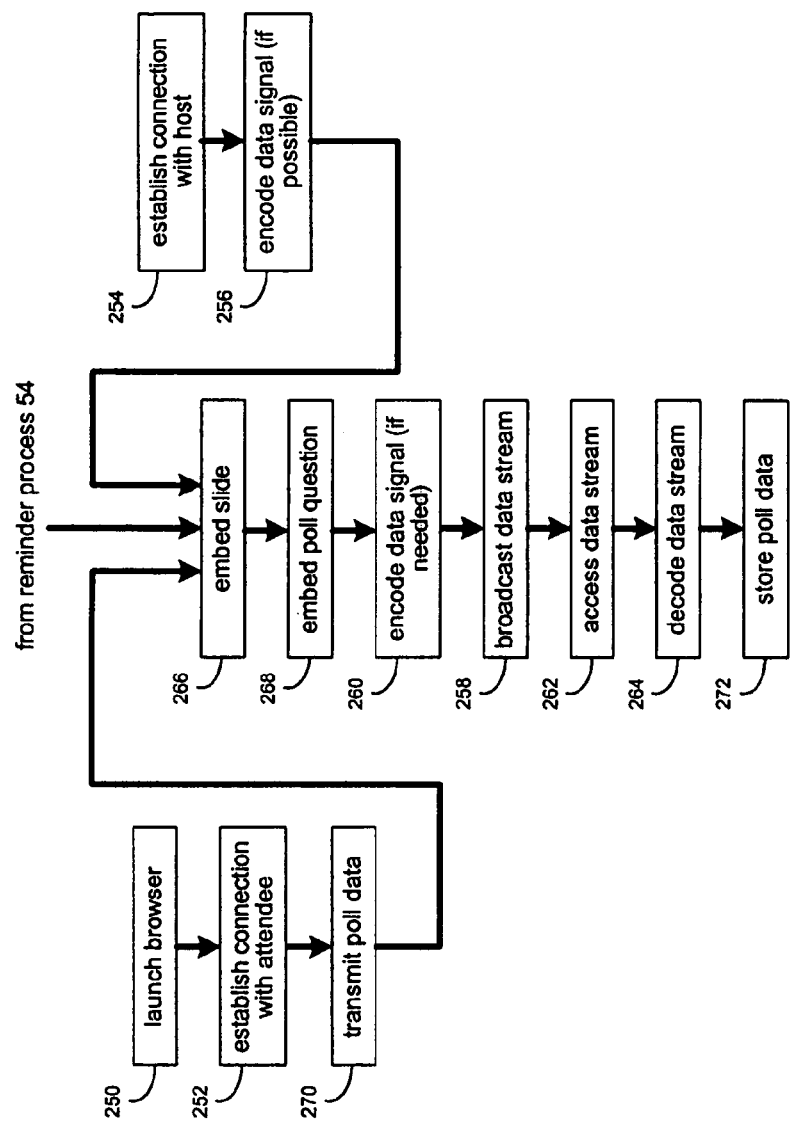
FIG. 5 is a block diagram of an execution process of the media event manager of FIG. 1.

Referring to FIG. 5, execution process 56 executes the media event. As stated above, at the time of registration, an applet (typically a cookie) is passed to the computer of the attendee, such that this cookie includes information concerning the attendee and the media event that the attendee registered for. Accordingly, at a predefined time prior to the media event (e.g., five minutes), a browsing program may be launched 250 by the applet resident on the attendee's computer. This browsing program may be any program capable of accessing the media event, such as Microsoft Internet Explorer™, Netscape Navigator™, or Real Networks Real Player™, for example.

A connection may be automatically established 252 between the attendee's computer (e.g., computer 28) and the server 38. Depending on the type of network connection maintained by the attendee, this may involve establishing a dialup connection to the Internet through an ISP (i.e., Internet service provider). Once connected to server 38, the attendee's computer will log into the media event by transmitting the relevant information (i.e., user name, user password, event time, date, and type, for example) to server 38.

Further, in the event that the attendee is accessing the media event via a handheld device (e.g., cellular phone 30 or personal digital assistants 34), a cellular data network connection is established prior to logging into server 38. Further, if a cellular phone is used by an attendee, depending on the particular model of cellular telephone, that attendee may only have access to the voice portion of the media event.

In addition to the connection required by the attendee(s), a connection is also established 254 between host device 26 and server 38. When host 12 schedules the media event, an applet (e.g., a cookie) is passed to the host device to allow for automated connection of host device 26 to network 24 and server 38. As discussed above, host device 26 may be one of several devices such as: a computer, a cellular telephone, or a video conferencing system, and the manner in which a connection is established between the device 26 and server 38 varies depending on the type of device. If the device is a cellular telephone or a personal digital assistant, a cellular Internet connection is established through an ISP that connects the device to server 38. Alternatively, if the device is a video conferencing device, a connection to server 38 is established through an ISDN (i.e., Integrated Services Digital Network) connection that connects the video conferencing device to a video conferencing backbone. Further, if host device 26 is a computer, the type of connection varies depending on the type of network connection (i.e., permanent or dial-up) between host device 26 and network 24.

During the media event, a data signal 58 is transmitted from the host device 26 to server 38. The format of this data signal 58 varies depending on the type of host device and the type of media event. For example, if host device 26 is a cellular telephone, the data signal 58 is a digitized voice signal. Alternatively, if host device 26 is a computer or video conferencing device, the data signal typically includes both video and audio components.

If the host device 26 is a computer, data signal 58 may be encoded 256 prior to being transmitted to server 38. Typical encoding schemes include MPEG (i.e., Moving Picture Experts Group) encoding, AVI (i.e., Audio Video Interleaved) encoding, and RM (i.e., Real Networks™) encoding, for example.

Once data signal 58 is received by server 38, data stream 60 is generated and broadcast 258 to the attendees. In the event that data signal 58 is already encoded (i.e., data signal 58 was sent by a host device that is a computer), data signal 58 is broadcast as a data stream 60 across network 24. Alternatively, if data signal 58 is not encoded or is encoded in a non-standard format, data signal 58 will be encoded 260 into a standard format (e.g., MPEG, AVI, and RM) prior to be broadcast as data stream 60. Depending on the type of media event, data stream 60 may be an audio stream, a video stream, or an audio/video stream. Data stream 60 may also carry a data channel that instructs a presentation to advance slides and display polls.

Figure 6:
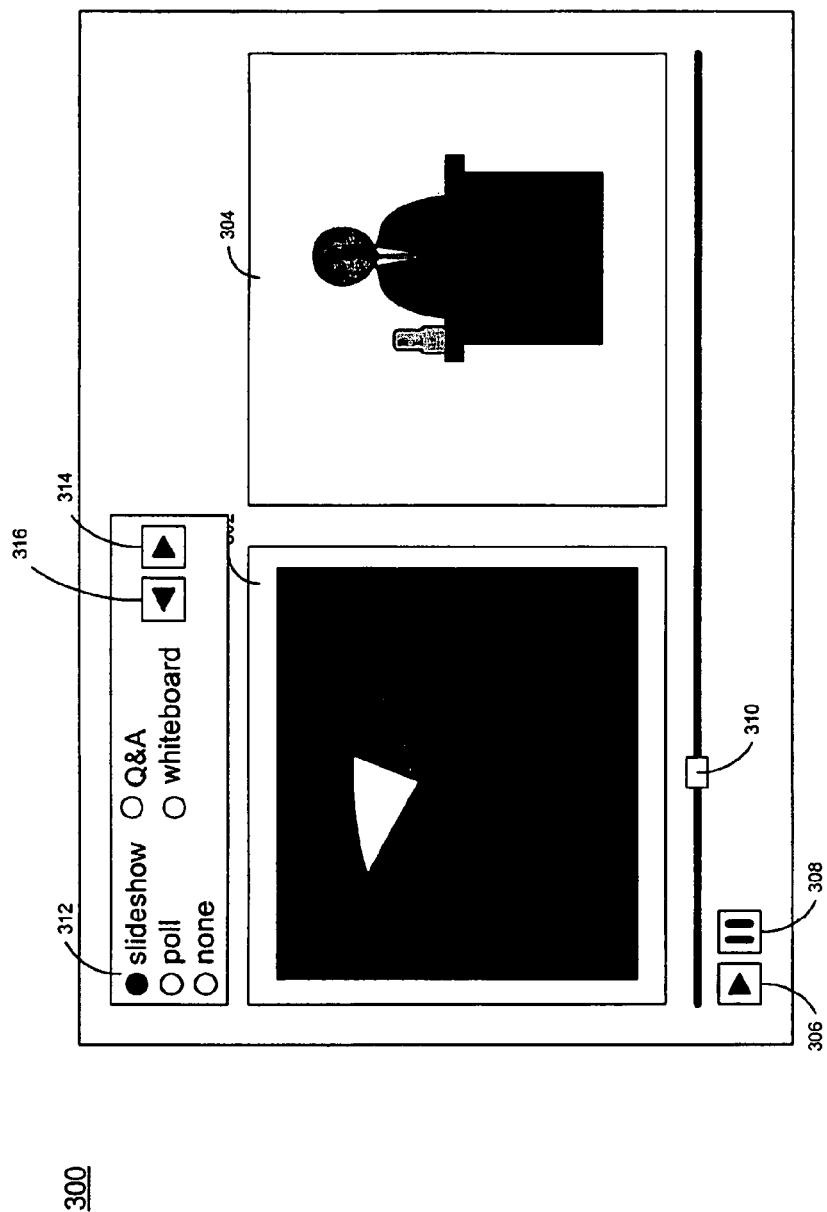
FIG. 6 is a block diagram of a browser of the media event manager of FIG. 1.

Referring to FIG. 6, attendees typically use browser 300 to access 262 data stream 60 broadcast by server 38. Typically, browser 300 includes multiple data fields 302, 304 that allow for the attendee to simultaneously view both a video broadcast (as shown in field 304) and a slideshow presentation (as shown in field 302) or a poll question (not shown).

Typically, browser 300 also includes a play button 306 that displays the media event, a pause button 308 that pause the displaying of the media event, and a scroll bar 310 that shows the current completion level of the media event with respect to the overall length of the media event. If the media event is live, the length is undetermined and there is no progress bar. Browser 300 typically includes the decoders required to decode 264 data stream 60.

When performing the media event, host 12 uses a browser similar to browser 300 with a few additional features. Browser 300 may include a selection tool 312 that allows a host to choose what to display in data field 302, such as a poll question, a slide of a slideshow, whiteboard, Q&A or nothing (i.e., a blank data field). Additionally, a pair of arrow buttons 314 and 316 allow host 12 to move forward and backward through the slideshow presentation, thus varying the display seen by the attendees. In the event that host 12 chooses to display a poll that includes multiple poll questions, arrow buttons 314 and 316 allow the host to toggle between the poll questions. In other embodiments, there may be a separate interface (not shown) to control slides, control polls and monitor a Q&A session. For example, the functions may be split between three different people operating three different browser windows.

In order to ensure that the slides of the slideshow (if applicable) and the poll questions (if applicable) are synchronized with the video and audio portions of data stream 60, execution process 56 embeds 266 the individual slideshow files (in a standard image file format) and embeds 268 the individual poll questions into data stream 260. Accordingly, by monitoring the image (i.e., slide or poll question) that the host currently has selected for displaying in data field 302 and embedding that image into the data stream (that includes the audio and/or video portions of the media event), synchronicity between the images and the audio/video portions is ensured.

In some cases, it may be too costly, in terms of bandwidth to embed an entire image file within a data stream. In these cases, an instruction to fetch an image is sent in the data stream. The instruction is interpreted by the presentation and the graphic is retrieved from a separate server. In other embodiments, images may be retrieved ahead of the presentation so that there is no propagation delay.

In the event that the host chooses to include one or more poll questions and the attendee responds to the poll questions, poll data 62 is transmitted 270 from the attendee's device (e.g., computer, personal digital assistant, or cellular telephone) to server 38. This poll data, which is stored 272 on server 38, typically identifies various pieces of information, such as the user's identifier and their response to the opinion question.

While the browser described above is shown to include two data fields, other configurations are possible. For example, the browser may include a third data field that allows the attendees to simultaneously view the video presentation, a poll question, and a slide of a slideshow.

While the system is described above as broadcasting a feature-rich audio/video data stream that includes both poll questions and a slideshow, the richness of the media event received by the attendee is limited by the device with which the attendee is accessing the data stream. For example, if the attendee is accessing the data stream using a cellular telephone incapable of displaying video, the attendee will be limited to an audio-only broadcast.

While the system is described above as being primarily executed on a server, other configuration are possible. For example, through the use of applets (e.g., cookies), events can be triggered on remote computers (e.g., the attendees' computer and handheld devices, and the host device). Therefore, the individual processes described above may actually be executed on multiple computers.

The system and method described herein is not limited to the implementation described above; it may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the information framer interface. The system and method may also be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

Additionally, implementations of the system and method described above need not be performed by a computer and/or computing device and may be performed manually using standard arithmetic processes and procedures.

A number of implementations have been described. Nevertheless, it will be understood that various modifications may be made. Accordingly, other implementations are within the scope of the following claims.

What is claimed is:

1. A method executed on a host computing device comprising:
   scheduling an online meeting facilitated by a server device, the scheduling including identification of a scheduled time of the meeting, the server device to couple the host computing device and an attendee client computing device in the meeting;
   receiving, at the host computing device from the server device, executable program code to, when executed, cause the host computing device to:
      compare a system time to the scheduled time of the meeting; and
      automatically launch, without user intervention, a connection to the server device for the meeting and an Internet browser on the host computing device for presentation of the meeting, when a predetermined difference between the system time and the scheduled time of the meeting is reached,
   wherein the executable program code automatically launches the Internet browser when the Internet browser is not already running on the host computing device;
   transmitting, by the host computing device, media data to the server device for the meeting;
   transmitting, by the host computing device, a poll during the meeting for automatic display on the attendee computing device coupled to the meeting; and
   receiving, at the host computing device, a poll response from the attendee computing device.

2. The method of claim 1, further comprising:
   providing a user interface that allows a user to select from among a slideshow, the poll, and a whiteboard;
   receiving a user selection of one of the slideshow and the whiteboard; and
   transmitting the one of the slideshow and the whiteboard to the meeting.

3. The method of claim 2, wherein transmitting the whiteboard comprises transmitting data usable to depict markings on a representation of a whiteboard.

4. The method of claim 1, wherein transmitting the media data and transmitting the poll comprises transmitting the media data and the poll for simultaneous display on the attendee computing device during the meeting.

5. The method of claim 4, wherein transmitting the media data and the poll comprises transmitting the media data and the poll for display in a same window.

6. The method of claim 1, further comprising connecting the host computing device to a cellular telephone; and transmitting audio only to the cellular telephone.

7. The method of claim 1, wherein the media data is transmitted from the host computing device to the attendee computing device by the server device on an intranet.

8. The method of claim 1, further comprising uploading a slideshow presentation to the server device prior to establishing the meeting; and securing the slideshow presentation from access by the attendee computing device until the host computing device indicates the slideshow presentation should be made accessible.

9. The method of claim 8, wherein uploading the slideshow presentation comprises receiving a user indication of data representative of a slideshow presentation and transmitting the data to the server device.

10. The method of claim 1, wherein a user defines a question and answers for the poll during scheduling.

11. The method of claim 10, wherein scheduling the meeting comprises receiving an indication of a desired meeting time from a user and transmitting the indication of the desired meeting time to the attendee computing device.

12. The method of claim 1, wherein the media data comprises at least one of slideshow data and live video data.

13. The method of claim 1, wherein transmitting the poll comprises transmitting an indication of a poll question.

14. The method of claim 1, wherein the host computing device establishes the meeting by connecting to a server device configured to distribute the media data from the host computing device to the attendee computing device.

15. A non-transitory computer readable medium comprising program code, which, when executed by a processor, causes the processor of a host computing device to:
   schedule an online meeting facilitated by a server device, the scheduling including identifying a scheduled time of the meeting, the server device to couple an attendee client computing device to the meeting;
   receive, from the server device, additional executable program code to, when executed by the processor, cause the host computing device to:
      compare a system time to the scheduled time of the meeting; and
      automatically launch, without user intervention, a connection to the server device for the meeting and an Internet browser on the host computing device for presentation of the meeting, when a predetermined difference between the system time and the scheduled time is reached, wherein the executable program code automatically launches the Internet browser when the Internet browser is not already running on the host computing device;

transmit media data to a plurality of computing devices communicatively coupled to the meeting;

provide a user interface that allows a user to select from among a slideshow, a poll, and a whiteboard;

receive a user selection of one of the slideshow, the poll, and the whiteboard; and transmit the one of the slideshow, the poll, and the whiteboard to the plurality of computing devices.

16. The non-transitory computer readable medium of claim 15, wherein the user selection is for the poll, wherein transmitting the poll comprises transmitting the poll for automatic display on the plurality of computing devices, and wherein the program code causes the processor to receive poll responses from the plurality of computing devices.

17. The non-transitory computer readable medium of claim 16, wherein transmitting the media data and transmitting the poll comprises transmitting the media data and the poll for simultaneous display on the plurality of computing devices.

18. The non-transitory computer readable medium of claim 17, wherein transmitting the media data and the poll comprises transmitting the media data and the poll for display in a same window on each computing device.

19. The non-transitory computer readable medium of claim 15, wherein one of the plurality of computing devices is a cellular telephone, and wherein transmitting media data comprises transmitting audio only to the cellular telephone.

20. The non-transitory computer readable medium of claim 15, wherein the media data is transmitted to the plurality of computing devices by the server device on an intranet.

21. The non-transitory computer readable medium of claim 15, wherein the program code causes the processor to upload a slideshow presentation to the server device prior to the meeting; and secure the slideshow presentation from access by the plurality of computing devices until the host computing device indicates the slideshow presentation should be made accessible.

22. The non-transitory computer readable medium of claim 15, wherein the user defines a question and answers for the poll during scheduling.

23. An apparatus comprising:
a processor; and
a memory communicatively coupled to the processor and comprising program code configured to cause the processor to:
receive a message from a first computing device requesting scheduling of a meeting event, the message including a scheduled time of the meeting;
send an invite to a second computing device to attend the meeting;
receive a response to the message from the second computing device agreeing to attend the meeting;
transmitting to the second computing device executable program code configured to:
compare a system time to the scheduled time of the meeting; and automatically launch, without user intervention, an Internet browser on the second computing device for presentation of the meeting when a predetermined difference between the system time and the scheduled time of the meeting is reached,
wherein the executable program code automatically launches the Internet browser when the Internet browser is not already running on the second computing device;
receive media data and a poll from the first computing device; and
transmit the media data and the poll to the second computing device for automatic, simultaneous display; and
receive a poll response from the second computing device.

24. The apparatus of claim 23, wherein the program code is further configured to cause the processor to:
receive a selection of one of a slideshow and a whiteboard from the first computing device; and
transmit the one of the slideshow and the whiteboard to the second computing device rather than the poll.

25. The apparatus of claim 23, wherein the program code is further configured to cause the processor to transmit the media data and the poll for display in a same window.

26. The apparatus of claim 23, wherein the program code is further configured to cause the processor to communicatively couple the first computing device to a cellular telephone; and transmit audio only to the cellular telephone.

27. The apparatus of claim 23, wherein the program code is further configured to cause the processor to:
receive a slideshow presentation prior to receiving the media data; and
securing the slideshow presentation from access by the second computing device until receiving an indication from the first computing device that the slideshow presentation should be made accessible.

28. A method comprising:
receiving, at a server, a message from a host computing device requesting scheduling of a meeting event, the message including a scheduled time of the meeting;
transmitting from the server to the host computing device executable program code configured to:
compare a system time to the scheduled time of the meeting; and
automatically launch, without user intervention, an Internet browser on the host computing device for presentation of the meeting when a predetermined difference between the system time and the scheduled time of the meeting is reached,
wherein the executable program code automatically launches the Internet browser when the Internet browser is not already running on the host computing device;
receiving, by the server, a communicative coupling from the host computing device;
receiving, at the server, media data from the host computing device and transmitting, by the server, the media data to an attendee computing device;
receiving, at the server, a poll from the host computing device and transmitting, by the server, the poll for automatic display on the attendee computing device; and
receiving, at the server, a poll response from the attendee computing device.

* * * * *